(12) United States Patent
Brown

(10) Patent No.: US 7,418,092 B2
(45) Date of Patent: Aug. 26, 2008

(54) VIRTUAL CALL CENTER

(75) Inventor: Wendell D. Brown, Las Vegas, NV (US)

(73) Assignee: Alto Ventures, Inc., Las Vegas, NV (US)

( * ) Notice: Subject to any disclaimer, the term of this patent is extended or adjusted under 35 U.S.C. 154(b) by 807 days.

(21) Appl. No.: 10/796,423

(22) Filed: Mar. 8, 2004

(65) Prior Publication Data

US 2005/0195962 A1    Sep. 8, 2005

(51) Int. Cl.
   *H04M 3/00* (2006.01)
(52) U.S. Cl. .............. 379/265.02; 379/265.01
(58) Field of Classification Search ................
   379/265.01–265.14, 266.01–266.1
   See application file for complete search history.

(56) References Cited

U.S. PATENT DOCUMENTS

| | | | | |
|---|---|---|---|---|
| 6,079,020 A * | 6/2000 | Liu | .............. | 726/15 |
| 6,810,034 B1 * | 10/2004 | Brand | .............. | 370/352 |
| 7,062,032 B1 * | 6/2006 | Bloom et al. | .......... | 379/265.04 |
| 7,072,657 B2 * | 7/2006 | Watanabe et al. | ........... | 455/439 |
| 2001/0040887 A1 * | 11/2001 | Shtivelman et al. | ......... | 370/352 |
| 2003/0002479 A1 * | 1/2003 | Vortman et al. | ............. | 370/352 |
| 2004/0141508 A1 * | 7/2004 | Schoeneberger et al. | .... | 370/401 |
| 2006/0165066 A1 * | 7/2006 | Campbell et al. | ........... | 370/352 |

* cited by examiner

*Primary Examiner*—William J Deane
(74) *Attorney, Agent, or Firm*—Townsend and Townsend and Crew LLP; Kenneth R. Allen

(57) ABSTRACT

A system and methods are provided for enabling real-time call control. with minimal requirements for dedicated telecommunications PBX and dedicated switching equipment. Dynamic call routing is handled by a network carrier's equipment and an interface is provided at the carrier switch to dynamically redirect calls from outside of the carrier's network. A call's signaling channel and bearer (voice) channel are separated, allowing the voice carriage to continue to be handled by the network carrier, but the routing of the call is controlled from outside of the carrier's network. A real-time signaling path and interface is provided into the carrier network such that the associated routing decisions and business logic can remain outside of the carrier network, while the carrier network continues to carry the voice channels.

19 Claims, 2 Drawing Sheets

VIRTUAL CALL CENTER

BACKGROUND OF THE INVENTION

This invention relates to the fields of computer and communications. More particularly, the invention relates to the dynamic routing and control of a voice telephone call in real-time.

In a company call center setting, a PBX or other switching equipment is deployed to redirect incoming customer calls to the next available customer service agent to handle the incoming customer call. This in-house PBX or switch equipment is often coupled to dedicated incoming phone lines which serve only that particular company.

In addition to routing an incoming call, an associated "screen-pop" is often presented on an agent's display in parallel with the incoming phone call. This "screen-pop" typically provides the phone agent with information associated with the customer.

Outsourced call centers provide a more generalized solution whereby a telecommunications infrastructure is shared among many customers. Outsourced call centers are typically serviced by many incoming phone line trunks which accept incoming phone calls for any of its customers. Agents may be dedicated to accept phone calls only for certain customers, but often agents are trained to accept incoming phone calls for a list of companies An automated call distribution (ACD) technique for this scenario is typically deployed by the call center's telecommunications equipment to automatically distribute the incoming calls to the appropriate agent.

Known outsourced call centers have several limitations and economic challenges. First, dedicated equipment can handle only a certain peak number of phone calls. Although the average utilization rate of the equipment and phone lines is typically much lower than the peak capacity, the call center must still pay for enough equipment capacity to handle peak demands. The difference between the average utilization rate and the peak demand levels can be very large, thus creating an economically inefficient use of the expensive dedicated equipment infrastructure.

Second, as a call center grows, it continually needs to expand its telecommunications infrastructure and the number of phone lines needed to handle the additional call load. The capital outlay for fixed telecommunications equipment is often expensive, and the optimal growth of the telecommunications infrastructure equipment can be difficult to predict.

Third, if outsourced call centers use external agents physically outside of the company's premises, such as work-at-home phone agents or offshore phone agents, then the PBX or switched telecommunications solution is inherently inefficient: typically two legs (two circuits) of phone lines are required, the first being an incoming circuit used to deliver the incoming call to the PBX, the second being an outgoing circuit placed to connect from the PBX to the external agent. Thus two circuits are activated and required for each such call.

What is needed is a solution that would improve efficiency and utilization rate of port use, provide higher available port capacity, use port capacity more flexibly (to reduce the need to accurately predict port needs), and provide an improved method of call routing for off-premises agents.

SUMMARY OF THE INVENTION

According to the invention, a system and methods are provided for enabling real-time call control with minimal requirements for dedicated telecommunications PBX and dedicated switching equipment. Dynamic call routing is handled by a network carrier's equipment and an interface is provided at the carrier switch to dynamically redirect calls from outside of the carrier's network. A call's signaling channel and bearer (voice) channel are separated, allowing the voice carriage to continue to be handled by the network carrier, but the routing of the call is controlled from outside of the carrier's network. A real-time signaling path and interface is provided into the carrier network such that the associated routing decisions and business logic can remain outside of the carrier network, while the carrier network continues to carry the voice channels.

The invention will be better understood by reference to the following detailed description in connection with the accompanying drawings.

DESCRIPTION OF SPECIFIC EMBODIMENTS OF THE INVENTION

The program environment in which an embodiment of the invention is executed illustratively incorporates a general-purpose computer or a special purpose device such as a telephone gateway. Details of such devices (e.g., processor, memory, data storage, display) are well known and are omitted for the sake of brevity.

The techniques of the present invention may be implemented using a variety of technologies. For example, the methods described herein may be implemented in software executing on a computer system or implemented in hardware utilizing either a combination of microprocessors or other specially designed application specific integrated circuits (ASICs), programmable logic devices (PLDs), gate arrays or various combinations thereof. In particular, the methods described herein may be implemented by a sequence of computer-executable instructions transported by or residing on a medium, such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention, a system and methods are provided for enabling an outside party to real-time control of a telephone call which is carried by a network carrier.

Figure 1:
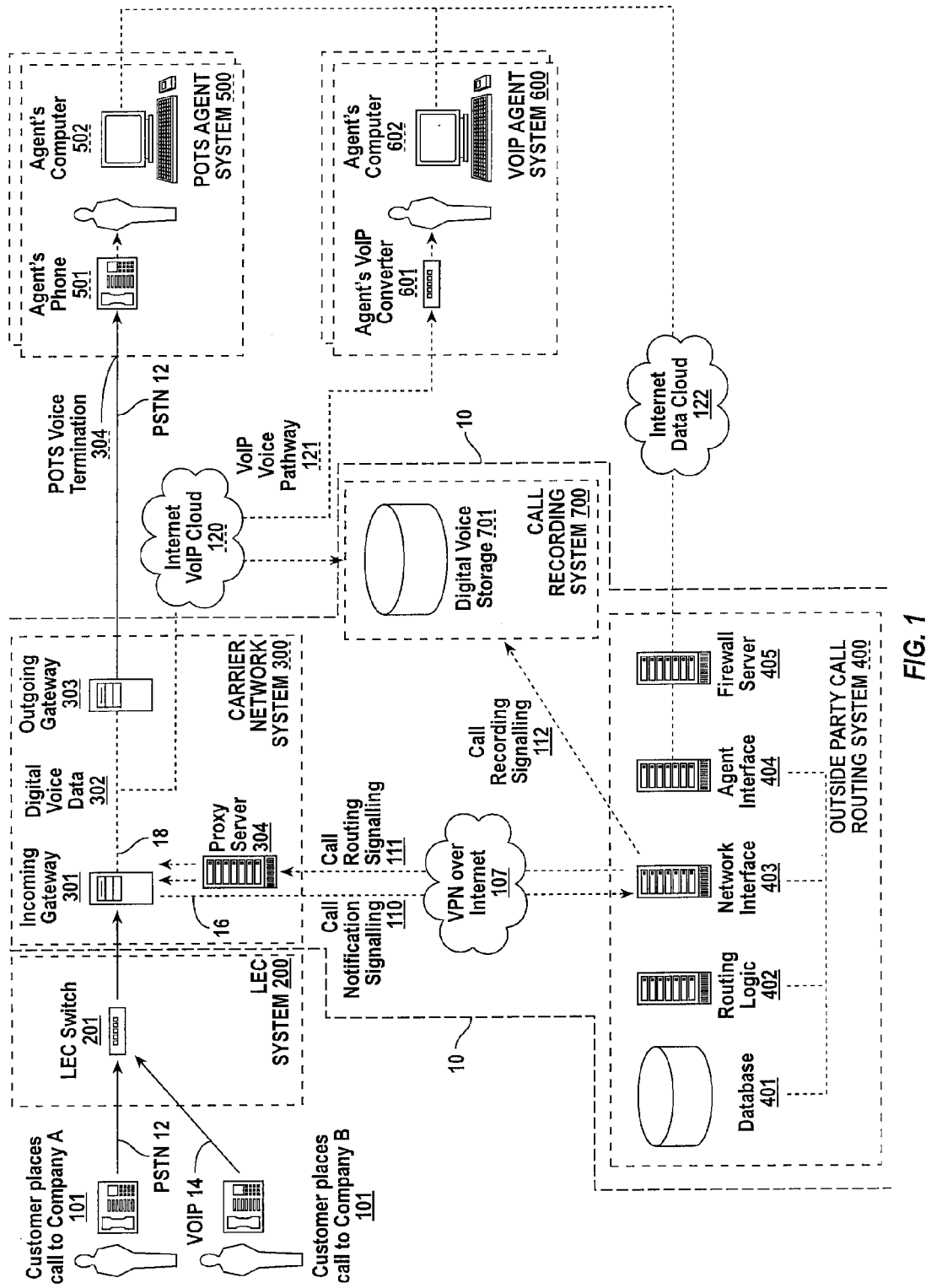
FIG. 1 is a block diagram depicting a real-time call control system in accordance with an embodiment of the present invention.

FIG. 1 illustrates one embodiment of the invention, which is built around a call control system 10 operative as a call center that is physically decentralized among control elements and agents. In FIG. 1, element 101 is a telephone from which an initial outgoing call is placed through the public switched telephone system (PSTN) 12, element 102 is another example telephone that is connected through a voice over IP (VOIP) system 14. Element 201 is a Local Exchange Carrier (LEC) switch which receives the call from phone 101 and/or phone 102 and routes it to a Carrier Network System 300. Element 301 is within the Carrier Network System 300, and element 301 is an incoming gateway which receives calls from LEC switch 201, typically transported in SS7 or other signaling environments and separates the call into its signaling channel (control) component 16 and its bearing (voice) channel component 18. Element 302 is within the Carrier Network System 300, and element 302 represents a digital Voice-over-IP pathway, typically signaled using SIP or other protocols, which connects calls from incoming gateway 301 to element 303, as herein explained.

Element 303 is within the Carrier Network System 300, representing an outgoing gateway which terminates calls received over pathway 302, and terminating calls via pathway 304 to element 501. Element 304 is a pathway, usually carried using SS7 or other standard signaling environments, which terminates a call into call recipient 501. System 500 includes of a human operator agent who is associated with a terminal element that receives incoming phone calls via pathway 304 into agent phone 501, and who interacts with a simultaneously synchronized data terminal 502. Real-time information such as callerID, agent scripts that are associated with that incoming phone number at 201, and other agent-specific information and/or call-specific information, are displayed in real-time to the agent. System 500 could be physically close to or far from the other shown systems. System 500 is preferably replicated for each individual agent.

System 600 is an alternative to System 500. There are combinations of both System 500 and System 600 in a typical total environment. System 600 includes a human operator agent who receives incoming phone calls at 601 via internet VoIP cloud 120 and via digital (internet) pathway 121. The agent in system 600 interacts with a simultaneously synchronized data terminal 602. Real-time information such as callerID, agent scripts that are associated with that incoming phone number at 201, and other agent-specific information, are displayed in real-time to the agent. System 600 could be physically close to or far from the other shown Systems. System 600 is preferably replicated for each individual agent.

Pathway 110 represents a signaling-only pathway (no voice channels) which signals to element 403 whenever a call is received into element 301. Element 110 is carried over the internet via an encrypted virtual private network (VPN) tunnel. Element 107 represents a public or private internet channel.

Path 111 represents a signaling-only pathway (no voice channels) which signals through Proxy Server 304 to Outgoing Gateway 303 of where and how to terminate the call initially signaled via 110.

A call routing system 400 is a system which manages and controls the routing of voice calls in the virtual call center. Routing system 400 could physically be remote or in close proximity to system 300, system 500, or system 600. System 400 includes various sub-units which could reside on multiple or single computers/servers. Subsystem 401 is a database accessible to all subsystems within routing system 400. Call routing logic 402 contains the business logic and call routing algorithms that control the calls notified via the notification path 110. Server 403 is a network control interface which interfaces call routing system 400 to a carrier network 300. Agent interface server 404 is a web server which interfaces, via internet cloud 405, to multiple agent systems 500 and/or multiple agent systems 600. Pathway 122 represents a public or private internet channel or so-called internet cloud.

Call recording system 700 records phone calls, on a streaming basis, on to hard disk or other storage devices. Pathway 112 controls system 700 for each individual call, or within sub-segments or each individual call.

Figure 2:
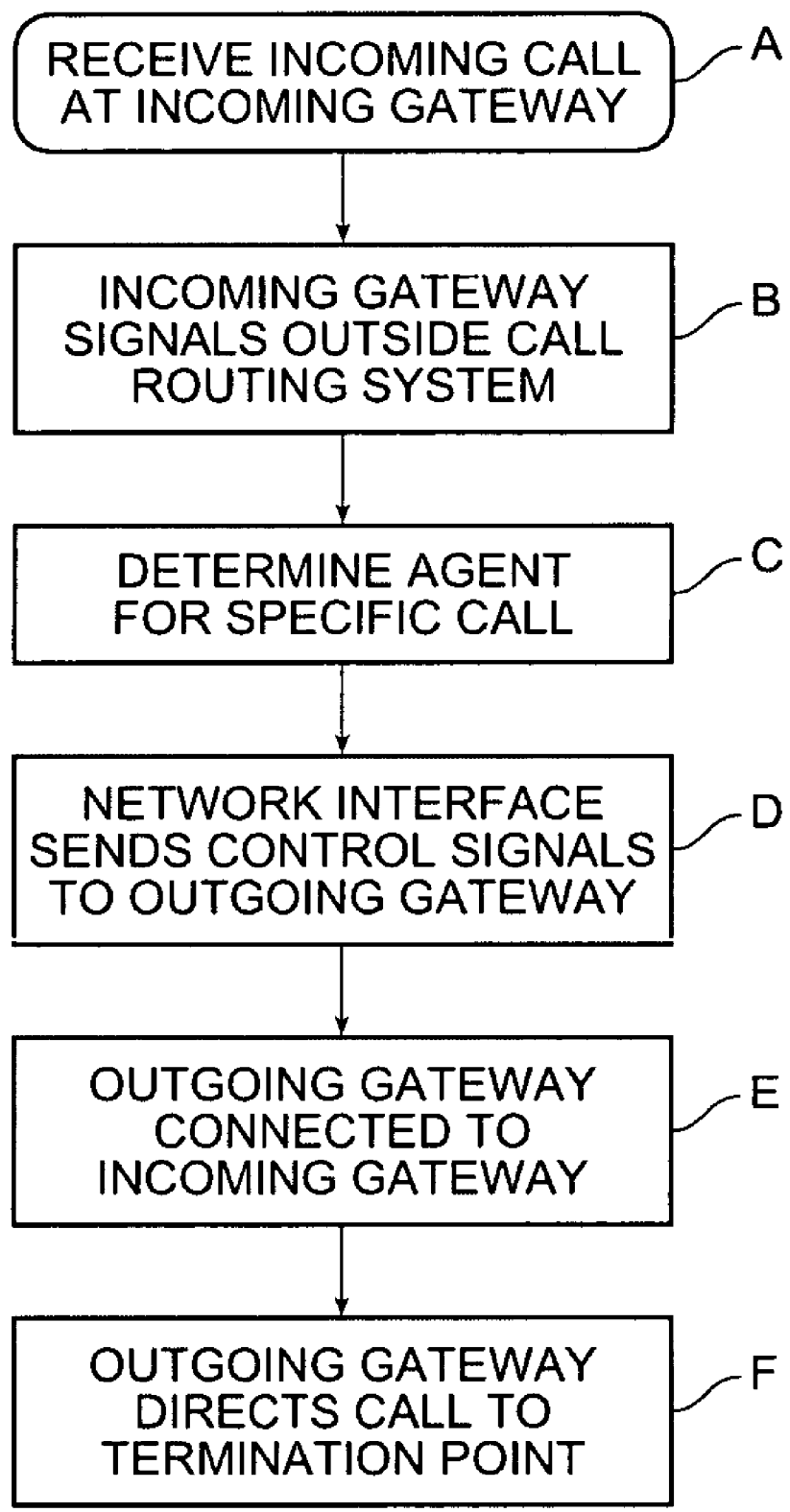
FIG. 2 is a flow chart of operations according to the invention.

The operation of the invention associated with the foregoing virtual call center is outlined in FIG. 2. In a call control system operative as a call center, the method for controlling routing of a random incoming telephone call involves receiving the incoming call at an incoming gateway 301 (Step A), then causing signaling from the incoming gateway 301 to the call routing system 400 that an incoming call has been received by the incoming gateway 301 (Step B). Then the call routing logic 402 determines from incoming call information and information about availability of a qualified agent at a termination point 501 the specific termination point to which said telephone call should be delivered (Step C). Then the network interface 403 signals with specific control signals to the outgoing gateway 303 coupled to the selected termination point 501 (Step D). The outgoing gateway 303 is caused to connect to the incoming gateway 301 via a digital voice packet connection 302 (Step E), and the call from the outgoing gateway 303 is directed to the selected termination point 501 (Step F).

In a particular embodiment, a call is placed by a calling customer to a Company A. However, where Company A has assigned its phone number to be answered by an outsourced call center, the call center handles the call. Not only may the call center handle Company A's phone number, but also Company B, and Company C, etc. The calling customer is identified (e.g., by the original called number and/or caller ID fields), and the call is first received by the local exchange carrier's (LEC) switch 201. The call is then handed off from the LEC system 200 to the network carrier system 300 which has been previously assigned to carry Company A's phone calls.

The network carrier 300 then sends a Call Notification Signal, in real-time, to the outside party call routing system 400 to the effect that an incoming phone call for Company A has been received. Information such as who the caller is (ANI/CallerID) is also transmitted to the outside party routing system 400. The outside party routing system 400, which could be in Company A itself, or in an outsourced call center, or at another third party, then determines how to best complete the call. This determination can be based on a plurality of inputs, including which agents are available at that time to handle the incoming call, which agent is best suited to handle the call, which agent has historically been the most successful at handling similar calls, etc. The outside party routing system 400 could choose to have its computer server equipment physically located within the physical premises of the network carrier 300 for simplicity and lower cost.

A call routing signal is then sent from the outside party routing system 400 back to the network carrier to instruct the network carrier how and where to direct, i.e., "terminate" the call to. The designated termination point could be within the company itself, an offsite agent, or an offshore agent. Alternatively, the incoming phone call could also be routed first to an automated touch-tone or voice response system for further processing before being then handed off to a human agent.

Upon receipt of the Call Routing Signal, the network carrier 300 then completes the call by directing it to the termination point 501, 601 (i.e., a specific agent) as specified by the outside party. This terminating leg could be completed to agents in a variety of forms, including as an analog call (POTS) or via Voice-Over-IP call carriage over digital lines.

Contemporaneously, as the network carrier 300 completes the call to the specified termination point 501, 601, the outside party routing system 400 typically sends a data/text signal to the agent's computer terminal 502, 602 regarding the incoming call.

The algorithm for the routing logic 402 takes into account the various factors to determine the most appropriate agent to whom to direct the call in real time. Information related to the incoming call include caller geography (inferred from callerID area code), prior communications from the same callerID or caller profile information, language required, the target phone number dialed by the caller, or transaction number. Information about the agent is also considered. Agent qualifications, availability in real time, language ability, agent's historical experience or success rate, agent's account ownership, labor cost of agent, telecommunication routing cost, telecommunication signal quality and mode (such as bandwidth, line quality, or video quality), gender where appropriate to the product or service, and even time of day. The algorithm constructs a matrix of factors between the caller and the agents to determine by weighting of the factors which is the agent best suited to handle the call. The weighting is first by required factors, followed by optional factors, with contemporaneous factors being weighted to identify the more suitable among available and initially qualified agents.

There are various applications and further expansions of the present invention. The invention permits external call control of a network's call flow. The invention may be used to manage incoming calls for a plurality of companies into a network carrier while the routing and termination of those calls are controlled by an outside party. Simultaneous screen pops (data) may be sent to the agent while the network carrier completes the voice call to the same agent (when in combination with various above features). The invention can be adapted to split the call's voice channel from its signaling path a) when the network carrier continues to carry the voice path or b) when an outside party provides signaling to the network of how to continue routing and/or termination of the call. The invention can also be used with a real-time recording function which can record a call in real-time (when in combination with various above).

The following is a source listing in pseudo-code form of components of the method according to the invention.

```
//-------------------------------------------------------------------------
//    Module:  IncomingCallBeginNotification
//    This module is invoked by the Carrier Network whenever an incoming call arrives
into the Incoming Gateway (301)
//     Input Variables:
//       String: CallerID - telephone number which caller is calling from
//       String: CalledNumber - telephone number called by the user
//       String: IncomingGatewayID - identifies which incoming gateway received the call
//       String: CircuitID - incoming gateway's incoming call identification number
//    Output variables:
//       String: Result (true if call was completed or false if call completion failed)
//    Tasks performed:
            Call ActivityLogger ("ReceivedIncomingCall", CallerID, CalledNumber,
IncomingGatewayID, CircuitID, timenow( ) );
            // Determine which company has been called based on the phone number the user
dialed
            CompanyBeingCalled = LookUpInDataBase ("Use Table: Phonenumber-CompanyID",
CalledNumber)
            // Determine which Agent should be assigned this incoming call
            AgentAssignedForThisCall = DetermineWhichAgentShouldReceiveThisCall
(CompanyBeingCalled, CallerID, IncomingGatewayID, timenow( ) );
            // Set in the Database which that this Agent is now busy
            WriteToDataBase ("Use Table: AgentID-Availability", AgentAssignedForThisCall,
"Agent is busy")
            // Determine what termination point (POTS or VOIP) the call should be directed
to for the assigned agent
            TerminationPoint = Call GetAgentsCurrentPhoneOrVoipTerminationPoint
(AgentAssignedForThisCall);
            // Set in the Database which Agent was assigned for this call. The specific
call is identified by the CircuitID
            WriteToDataBase ("Use Table: CircuitID-AgentID-TerminationPoint", CircuitID,
AgentAssignedForThisCall, TerminationPoint)
            // Depending upon method of termination, complete the call to the termination
point
             If (TerminationPoint.POTS == TRUE) then Call SendSignalToOutgoingGateway
(IncomingGatewayID, CircuitID, TerminationPoint.TerminationPhoneNumber, "Complete call
CircuitID from IncomingGateway to TerminationPoint")
             If (TerminationPoint.VOIP == TRUE) then Call
SendSignalToAgentsVOIPConverter601 (TerminationPoint.IPAddress, IncomingGatewayID,
CircuitID, "Connect call CircuitID from IncomingGateway")
            // Determine what information should be displayed on the Agent's computer
screen, send that data to the Agent's screen
            DataToDisplayOnAgentsScreenForThisCall = LookUpInDataBase ("Use Table:
CompanyID-ScreenData", CompanyBeingCalled)
            SendDataToAgentsComputer (AgentAssignedForThisCall, CallerID +
DataToDisplayOnAgentsScreenForThisCall)
            // Begin the call recording for certain clients
            If (CompanyBeingCalled.RecordTheirCalls == True) then CallRecording
(IncomingGatewayID, CircuitID, "Start Recording")
            //  At this point the call has been connected to the appropriate Agent, screen
data sent to Agent, and Recording begun.
            Return (true);    // True because call was successfully routed
//-------------------------------------------------------------------------
//    Module:  IncomingCallEndNotification
//    This module is invoked by the Carrier Network whenever an incoming call was ended
(hung up) by either party
//     Input Variables:
//       String: CallerID - telephone number which caller is calling from
```

```
//      String: CalledNumber - telephone number called by the user
//      String: IncomingGatewayID - identifies which incoming gateway received the call
//      String: CircuitID - incoming gateway's incoming call identification number
//   Output variables:
//      String: Result (true if call was completed or false if call completion failed)
//   Tasks Performed:
        Call ActivityLogger ("EndIncomingCall", CallerID, CalledNumber,
IncomingGatewayID, CircuitID, timenow( ) );
        // Read from DataBase which agent took this call - which agent was previously
assigned for this incoming call
        AgentAssignedForThisCall, TerminationPoint = LookUpInDataBase ("Use Table:
CircuitID-AgentID-TerminationPoint", CircuitID)
        // Depending upon method of termination, end the call to the termination point
        If (TerminationPoint.POTS == TRUE) then Call SendSignalToOutgoingGateway
(IncomingGatewayID, CircuitID, TerminationPoint.TerminationPhoneNumber, "End call
CircuitID from IncomingGateway to TerminationPoint")
        If (TerminationPoint.VOIP == TRUE) then Call
SendSignalToAgentsVOIPConverter601 (TerminationPoint.IPAddress, IncomingGatewayID,
CircuitID, "End call CircuitID from IncomingGateway"))
        // Determine what information should be displayed on the Agent's computer
screen, send that data to the Agent's screen
        DataToDisplayOnAgentsScreenForThisCall = "Dear Agent: This call has now
ended.")
        SendDataToAgentsComputer (AgentAssignedForThisCall, CallerID +
DataToDisplayOnAgentsScreenForThisCall)
        // Set in the Database which that this Agent is available again
        WriteToDataBase ("Use Table: AgentID-Availability", AgentAssignedForThisCall,
"Agent is available")
        // End the call recording for certain clients
        If (CompanyBeingCalled.RecordTheirCalls == True) then CallRecording
(IncomingGatewayID, CircuitID, "End Recording")
        //  At this point the call has been disconnected from the Agent, screen data
sent to Agent, and Recording ended.
        Return (true);    // True because call was successfully routed
//--------------------------------------------------------------------------
//   Module:  AgentCheckedIn
//     Input Variables:
//       String: AgentID - Agent's identification number
//     Output variables:
//        None
//   Tasks Performed:
//      This module is called when the Agent logs into website to inform system that
Agent is now available to receive calls
        // Set in the Database which that this Agent is available again
        WriteToDataBase ("Use Table: AgentID-Availability", AgentID, "Agent is
available")
        ActivityLogger ("Agent is available", AgentID, timenow( ) );
        Return( );
//--------------------------------------------------------------------------
//   Module:  AgentCheckedOut
//     Input Variables:
//       String: AgentID - Agent's identification number
//     Output variables:
//        None
//   Tasks Performed:
//      This module is called when the Agent logs into website to inform system that
Agent is not available to receive calls
        // Set in the Database which that this Agent is available again
        WriteToDataBase ("Use Table: AgentID-Availability", AgentID, "Agent is not
available")
        ActivityLogger ("Agent is not available", AgentID, timenow( ) );
        Return( );
//--------------------------------------------------------------------------
//   Module:  DetermineWhichAgentShouldReceiveThisCall
//     Input Variables:
//       String: CompanyBeingCalled - identifies which company/client/phone number this
call is for
//       String: CallerID - telephone number which caller is calling from
//       String: IncomingGatewayID - identifies which incoming gateway received the call
//       String: timenow - current time/date
//     Output variables:
//       String: AgentID - Selected Agent's identification number
//   Tasks Performed:
//      Determine: 1) Which Agents are qualified to receive this call then 2) which
Agent is best suited to receive this call
        // First create a list of 1 or more Agents who are Qualified to handle this
call
        ListOfQualifiedAgents = null;
        While Loop {   (ThisAgent = Loop through list of all Agents)
```

-continued

```
            If ( ThisAgent.Available == IsAvailableNow) and    //is this Agent
currently available?
                If ( ThisAgent.TrainingCredentials == CompanyBeingCalled) and // does this
agent have the correct training to handle calls for this company?
                    If ( ThisAgent.LanguageAbilities == CompanyBeingCalled.Language) and
//can this agent speak the necessary language?
                        If (additional criteria necessary for an agent to handle a call for
CompanyBeingCalled)
                    Then ListOfQualifiedAgents += ThisAgent    //add this Agent onto the
list of Qualified agents
        } end while;
        // Second now determine which of the Qualified agents is the best suited for
this particular call
        While Loop { (ThisAgent = Loop through ListOfQualifiedAgents)
                MatrixTotalWeight = 0;      //start out with zero
                // Load various matrix weighting criteria - for this CompanyBeingCalled
(and/or for this phone number called)
        MatrixWeighting = LookUpInDataBase ("Use Table: MatrixWeights-CompanyID",
CompanyBeingCalled)
                // Evaluate a matrix of various factors, based on both caller
information and agent information.
                // Each element of matrix is considered, then assigned a weighted
number of points depending
                //    upon importance of that element for that company (or for this phone
number).
                // Some weights are dependent upon the CompanyBeingCalled, other weights are
independent of CompanyBeingCalled
                    If (ThisAgent.QualityRating == A) MatrixTotalWeight +=
MatrixWeighting.A;   // Add points according to quality rating
                    If (ThisAgent.QualityRating == B) MatrixTotalWeight +=
MatrixWeighting.B;   // Add points according to quality rating If
(ThisAgent.QualityRating == C) MatrixTotalWeight += MatrixWeighting.C;    // Add points
according to quality rating
                    If (ThisAgent.LaborCost is between [$0.00 and $0.50] )
MatrixTotalWeight += 5;   // Add points for low-cost rate
                    If (ThisAgent.LaborCost is between [$0.50 and $1.00] )
MatrixTotalWeight += 2;   // Add points for low-cost rate
                    If (ThisAgent.TelecomCost < $.05) MatrixTotalWeight += 2;
                // Add points for low-cost rate
                    If (ThisAgent.HistoricalSuccess[CompanyBeingCalled] )
MatrixTotalWeight += 10;   // Add points prior success rate
                    If (ThisAgent.PreviousCalls[CallerID]) MatrixTotalWeight += 10;    //Add
points if this Agent knows this Customer
                    If (ThisAgent.LanguageAccent == IncomingGatewayID.LanguageAccent)
NumberPointsForThisAgent += 1;   //Add points if this Agent's language dialect is
similar to the local language dialect of where this call was received at
                    If (ThisAgent.LineQuality > 80% ) MatrixTotalWeight += 5;     // Add
points for high quality voice connection
                    // Other criteria here to select best suited agent
                    ListOfQualifiedAgents.TotalWeight= MatrixTotalWeight;     // Assign this
Agent the total computed weighted Matrix value
        } end while;
        // Select one agent, among all of the Qualified agents, with the highest total
matrix weight
            AgentID = ListOfQualifiedAgents [ select which Agent has the highest
ListOfQualifiedAgents.TotalWeight]
                Return( );
//-------------------------------------------------------------------------
//   Module:  SendSignalToOutgoingGateway
//     Input Variables:
//        String: IncomingGatewayID - identifies which incoming gateway has received call
//        String: CircuitID - identifies specifically which call
//        String: TerminationPoint - identifies where to terminate call to (POTS phone
number or VOIP)
//        String: Action - specifies action
//     Output variables:
//        None
//     Tasks Performed:
//        Instruct Outgoing Gateway where to terminate call to
            // Instruct outgoing gateway to take action "Action" for call "CircuitID" at
            //    incoming gateway "IncomingGatewayID" to termination point
"TerminationPoint"
            // e.g. Dial outbound call to "TerminationPoint", then connect that outbound
call to IP stream at IncomingGatewayID.CircuitID
                Return( );
//-------------------------------------------------------------------------
//   Module:  SendSignalToAgentsVOIPConverter601
//     Input Variables:
//        String: IncomingGatewayID - identifies which incoming gateway has received call
```

-continued

```
//      String: CircuitID - identifies specifically which call
//      String: TerminationPoint - identifies where to terminate call to (POTS phone
number or VOIP)
//      String: Action - specifies action
//   Output variables:
//      None
//   Tasks Performed:
//      Instruct Agents VOIP converter 601 where to connect call to
          // Instruct Agents VOIP converter 601 to take action "Action" for call
"CircuitID" at
            //   incoming gateway "IncomingGatewayID"
          // e.g. Connect Agent's phone to IP stream at IncomingGatewayID.CircuitID
          Return( );
//----------------------------------------------------------------------
//   Module:  GetAgentsCurrentPhoneOrVoipTerminationPoint
//     Input Variables:
//        String: AgentID - identifies Agent
//     Output variables:
//        String: TerminationPoint - Termination point (VOIP or POTS) where agent is
available at now
//     Tasks Performed:
//        Looks into database to determine which termination point (VOIP or POTS) where
agent is available at now
          //   This database table is set by the Agent's preferences
          TerminationPoint = LookUpInDataBase ("Use Table: AgentID-TerminationPoint",
TerminationPoint)
          Return( );
//----------------------------------------------------------------------
//   Module:  SendDataToAgentsComputer
//     Input Variables:
//        String: AgentID - identifies which agent to send the data to
//        String: DataToDisplayOnAgentsScreen - specific data to display to Agent
//     Output variables:
//        None
//     Tasks Performed:
//        Send Data to Agents screen (screen pop)
          // Transmit DataToDisplayOnAgentsScreen via Agent Interface 404 to Agent's
computer 502/602
          Return( );
//----------------------------------------------------------------------
//   Module:  CallRecording
//     Input Variables:
//        String: IncomingGatewayID - identifies which incoming gateway has received call
//        String: CircuitID - identifies specifically which call
//        String: Action - to either begin or end recording
//     Output variables:
//        None
//     Tasks Performed:
//        Control digital recording of call for Digital Voice Storage 701
          // Send commands signals via 112 to Digital Voice Storage 701
          // Information IncomingGatewayID and CircuitID provides specific information
          //    as where to obtain incoming streaming data from to record.
          Return( );
//----------------------------------------------------------------------
//   Module:  LookUpInDataBase
//     Input Variables:
//        String: Database - identifies which database to look for index in
//        String: Index - Search database for this index string
//     Output variables:
//        String: Resulting output from Database for that Index input.
//     Tasks Performed:
//        Return result output from Database for that Index input.
          // Database code here
          Return( );
//----------------------------------------------------------------------
//   Module:  WriteToDataBase
//     Input Variables:
//        String: Database - identifies which database to write to
//        String: Index - index string
//        String: Data - data to be written into the Database for that Index
//     Output variables:
//        None
//     Tasks Performed:
//        Write the Data into the Database.
          // Database code here
          Return( );
//----------------------------------------------------------------------
//   Module:  ActivityLogger
//     Input Variables:
```

-continued

```
//      String: String 1 - First text string to enter into log
//      String: String 2 - Second text string to enter into log
//      String: String 3 - Third text string to enter into log
//      String: String 4 - Fourth text string to enter into log
//      String: String 5 - Fifth text string to enter into log
//      String: String 6 - Sixth text string to enter into log
//   Output variables:
//      None
//   Tasks Performed:
//      Enter all of the incoming string variables into a system activity log for
debugging purposes.
//----------------------------------------------------------------
//   Module:   timenow( )
//   Input Variables:
//      None
//   Output variables:
//      Returns the current time now as a text string
//   Tasks Performed:
//      Sets the returning string with the current system time
```

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. In a call control system operative as a call center, said call center being physically distributed, a method for controlling routing of a telephone call comprising:
    receiving a call at an incoming gateway (301) of the call control system (10);
    separating the call into components of a signaling channel (16) and a bearer channel (18);
    signaling from the incoming gateway to a call control system that said call has been received by the incoming gateway;
    determining via a call routing system (400) the termination point to which said telephone call should be delivered from incoming call information of the signaling channel (16) and from information and availability of a qualified agent at a termination point (500 or 600) to establish a selected termination point;
    signaling with control signals from said call control system to an outgoing gateway coupled to said selected termination point;
    causing said an outgoing gateway (308) to connect to the incoming gateway (301) via a digital voice packet connection to carry content of said bearer channel (18); and
    directing content of said bearer channel (18) of said call from the outgoing gateway (308) to said selected termination point (500 or 600).

2. The method according to claim 1 wherein said receiving step includes receiving the call from a publicly-switched telephone network into the incoming gateway, said incoming gateway converting said incoming phone call into digital voice packets.

3. The method according to claim 1 wherein said receiving step includes receiving the call in voice-over-IP format.

4. The method according to claim 1 wherein said directing step includes connecting the call via voice-over-IP means to a digital voice termination point.

5. The method according to claim 1 wherein said termination is via voice-over-IP.

6. The method according to claim 1 wherein said directing step comprises connecting the call via the publicly-switched telephone network.

7. The method according to claim 1 wherein said call control system is external and isolated from said incoming gateway and from said outgoing gateway, said call control system being routing system is connected via a virtual private network.

8. The method according to claim 1 wherein said termination point is partially dependent upon a phone number to which said call is originally directed.

9. The method according to claim 1 wherein said termination point is partially dependent upon a phone number as originally called from.

10. The method according to claim 8 wherein said termination point is partially dependent upon a toll-free phone number to which said call is originally directed.

11. The method according to claim 1 wherein said incoming gateway is also incorporated into said outgoing gateway.

12. The method according to claim 1 wherein said outgoing gateway is operative to forward digital voice packets from the incoming gateway without conversion.

13. The method according to claim 1 further including recording digital packet data from the incoming gateway in a digital storage unit.

14. The method according to claim 1 further including the step of dynamically redirecting the call from the termination point to a further termination point.

15. The method according to claim 1 further including signaling from the call control system to a visual display at the terminal point to convey related call-specific information to the agent at the termination point.

16. A call control system comprising:
    an incoming gateway apparatus (301) operative to receive a call from the call control system (10);
    an apparatus (301) configured to separate the call into components of a signaling channel (16) and a bearer channel (18);
    an apparatus (402) configured to determine via a call routing system (400) the termination point to which said call should be delivered from incoming call information of the signaling channel (16) and from information and availability of a qualified agent at a termination point (500 or 600) to establish a selected termination point (500 or 600);

an apparatus (302) to connect an outgoing gateway (308) to the incoming gateway (301) via a digital voice packet connection to carry content of said bearer channel (18);

an apparatus (403) for directing content of said bearer channel (18) of said call from the outgoing gateway (308) to said selected termination point (500 or 600);

an apparatus (405) for contemporaneously signaling from a the call control system to an agent screen visual display (502 or 602) at the termination point (500 or 600) to provide call-specific information regarding the call; and an agent interface server (404) operative to provide call-specific information to the agent screen (502, 602) at the termination point (500 or 600).

17. The apparatus according to claim 16 wherein said agent interface server (404) is an instant messaging type server.

18. The apparatus according to claim 16 wherein said agent interface server (404) is web type server which can interact with a window on a client terminal at the termination point (500, 600).

19. The apparatus according to claim 16 wherein said agent interface server (404) is a proprietary messaging type server.

* * * * *